United States Patent [19]

Clain et al.

[11] 4,238,091
[45] Dec. 9, 1980

[54] SAFETY DEVICE FOR RETENTION OF A SPARE-TIRE CRADLE

[75] Inventors: Philippe Clain, Pontchartrain; Christian Faye, Rueil Malmaison, both of France

[73] Assignee: Regie Nationale des Usines Renault, Boulogne-Billancourt, France

[21] Appl. No.: 953,845

[22] Filed: Oct. 23, 1978

[30] Foreign Application Priority Data

Oct. 21, 1977 [FR] France ................... 77 31707

[51] Int. Cl.³ ............................................. B62D 43/04
[52] U.S. Cl. .............................. 224/42.23; 224/42.06; 292/25
[58] Field of Search ............ 224/42.23, 42.03 R, 224/42.03 A, 42.04, 42.05, 42.06, 42.07, 42.08, 42.12, 42.13, 42.21, 42.24, 42.41, 42.45 R, 42.46 R; 292/DIG. 14, 25, 351

[56] References Cited

FOREIGN PATENT DOCUMENTS

| | | | |
|---|---|---|---|
| 1238793 | 4/1967 | Fed. Rep. of Germany | 224/42.23 |
| 1141976 | 9/1957 | France | 224/42.23 |
| 1551853 | 11/1968 | France | 224/42.23 |
| 7332804 | 9/1973 | France | 224/42.23 |
| 1006236 | 9/1965 | United Kingdom | 224/42.23 |

Primary Examiner—Robert J. Spar
Assistant Examiner—Jerold M. Forsberg
Attorney, Agent, or Firm—Oblon, Fisher, Spivak, McClelland & Maier

[57] ABSTRACT

The locking mechanism of the cradle is associated with a safety catch articulated on a fixed support and capable of pivoting automatically against a return element in retracting beneath the floor of the vehicle, by the raising of the cradle with the help of the locking mechanism.

3 Claims, 5 Drawing Figures

SAFETY DEVICE FOR RETENTION OF A SPARE-TIRE CRADLE

BACKGROUND OF THE INVENTION

1. Field of the Invention

The present invention relates to a safety device for the retention of a spare-tire cradle, where the cradle is locked under the floor of a motor vehicle.

2. Description of the Prior Art

The disposition of the spare tire horizontally under the floor of a motor vehicle, most often in the rear of the vehicle, in a cradle or pan mounted so as to pivot under the body of the vehicle is known in the art.

Also known is providing a locking mechanism accessible only from the inside of the trunk for the support of the cradle, so as to make theft of the spare tire more difficult.

This mechanism may either be associated with a safety catch independent of the lock, analogous in type to the retaining hook on the vehicle hood, or the locking mechanism may be integrally combined with the safety catch.

French Application No. 73/32,804 in the name of the present application is an example of the latter type of safety catch.

However, when the safety catch is tied to the functioning of the lock, failure of the latter results in the simultaneous disappearance of the safety catch. The support of the cradle in case of the failure of the locking mechanism is no longer assured, which may then release the spare tire while the vehicle is moving.

Safety catches totally independent of the locking mechanism are harder to manipulate since it is necessary to act separately on the lock and on the safety to free the cradle.

Moreover, when the cradle is pulled up and locked under the floor of the vehicle, the safety catch remains in place under the cradle, presenting a dangerous and unesthetic projection from the body.

The aim of the invention is to avoid the above mentioned drawbacks and to realize a simple and inexpensive safety device, easily adaptable to existing locking mechanisms and functioning exclusively in connection with the motion of the pivoting cradle.

SUMMARY OF THE INVENTION

To this end, the invention has as object a retaining hook for the cradle associated with the lock but independent of its operation, and a hook mounted so as to pivot on a fixed part of the body and acted on by a return spring, the hook being able to disappear by pivoting up under the vehicle floor when the cradle is drawn up by the lock as a result of the cradle pushing against the cam like profile of the hook.

Conversely, when the cradle is lowered either by action on the threaded shank of the existing lock or by accidental failure of the lock, the hook is automatically returned to its safety position by its spring.

In addition, the end of the safety catch has a tab intended for entraining the hook of the lock.

Thus, the manipulation of the safety-catch hook simultaneously also frees the lock in order to lower the cradle for removing the spare tire.

Moreover, when the cradle is initially pushed up again, it is automatically engaged in the hook of the lock entrained by that of the safety catch.

BRIEF DESCRIPTION OF THE DRAWINGS

Various other objects, features and attandant advantages of the present invention will be more fully appreciated as the same becomes better understood by reference to the following detailed description when considered in connection with the accompanying drawings wherein like reference characters designate like or corresponding parts throughout the several views, and wherein.

DETAILED DESCRIPTION OF THE PREFERRED EMBODIMENTS

Figure 1:
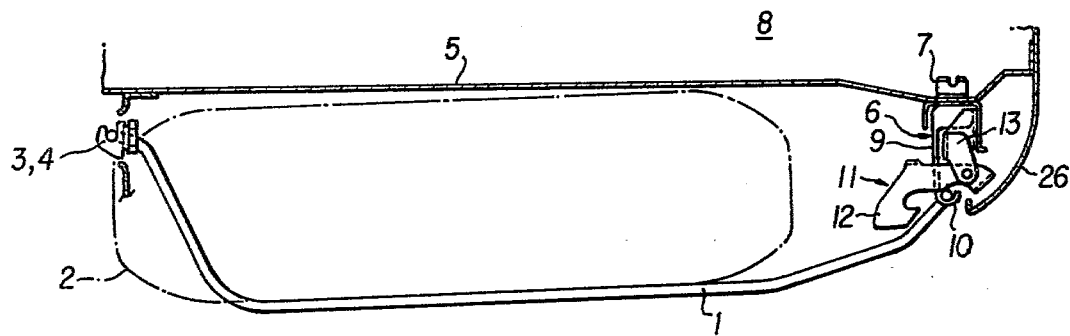
FIGS. 1 and 2 show, in side view and from below the cradle for a spare tire and its locking mechanism equipped with the safety catch of the invention.
Figure 2:
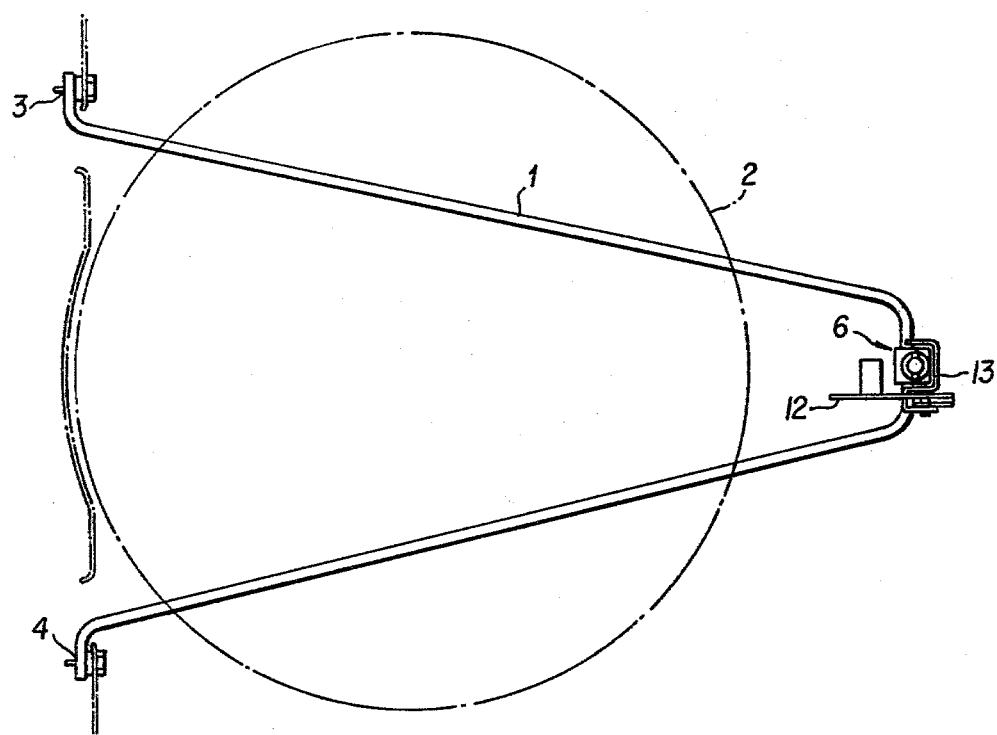

FIGS. 1 and 2 show clearly the preferred embodiment of the invention.

A cradle 1 for the spare tire 2 is mounted so as to pivot about two articulations 3, 4 under the rear floor 5 of a motor vehicle.

The cradle can be lowered or raised at will by the action of a conventional lock 6 with a threaded shank 7 passing through the floor and accessible for operation by way of the trunk 8 of the vehicle, the shank linearly displacing the body 9 of the lock which terminates in a hook 10 which in turn supports the cradle 1. By the reaction of the cradle on the lock, the latter is kept from rotating until manual disengagement of the cradle is performed in order to free the spare tire 2.

According to the invention, the lock 6 is associated with a safety arrangement 11 formed essentially by a hook 12 retractable under the floor and by its support 13.

Figure 5:
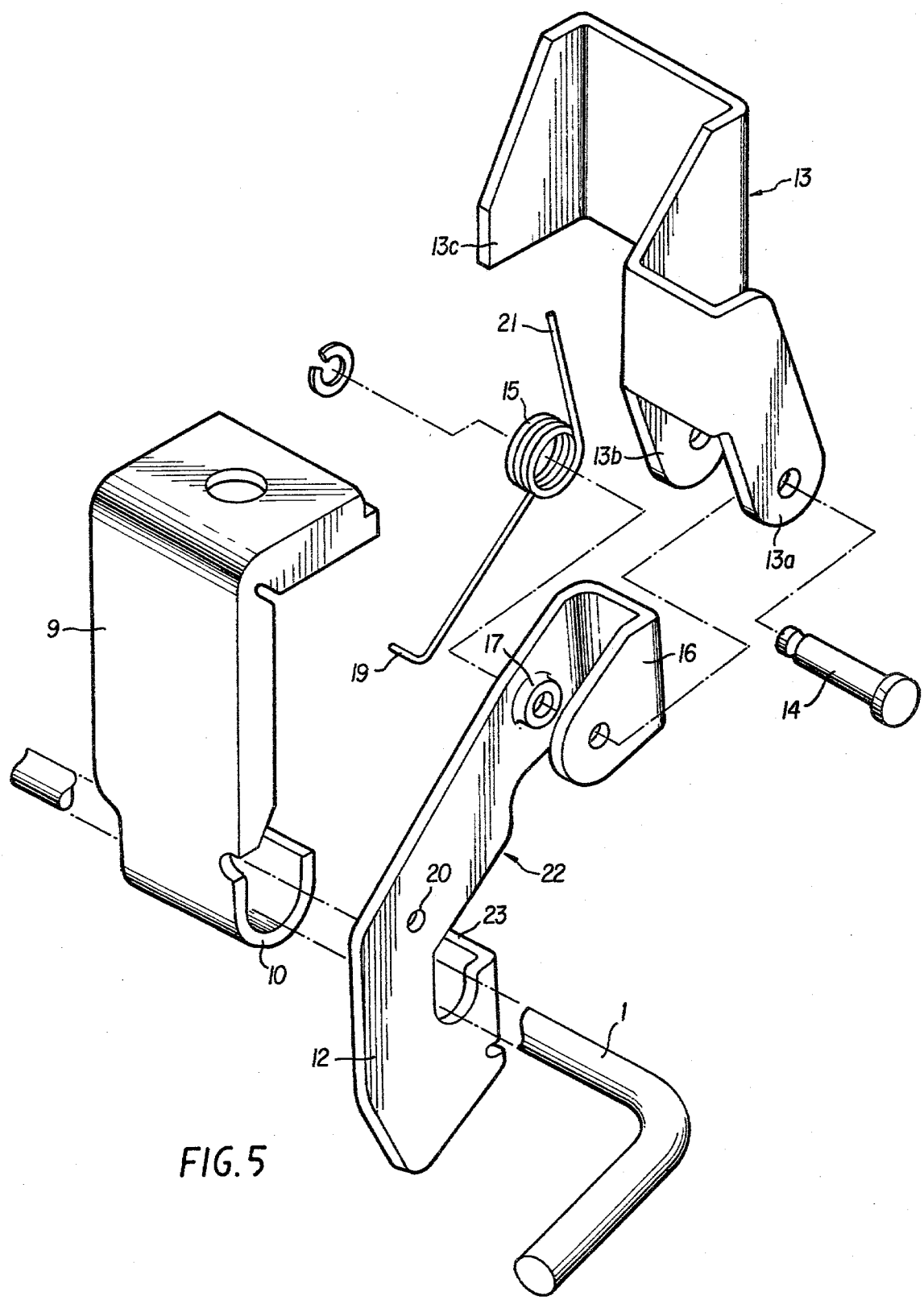
FIG. 5 is an exploded perspective view of the safety catch associated with the hook.

As is seen in FIG. 5 the safety catch 12 is articulated in a fork 16 on its support 13 by the intermediary of a shaft 14 passing through the two wings 13a and 13b of the support. This mounting insures the vertical stability of the hook.

A spring 15 wrapped around the shaft 14 provides for the return of the hook 12 to the safety position shown, i.e. engaging the rod of the cradle 1.

With the aim of facilitating the mounting of the hook on the vehicle, the return spring 15 is first installed in the fork 16 of the hook and held in position thanks to two internal bosses 17 centered on the shaft.

The support 13 forms a double fork in an S-shape.

The first fork 13a and 13b, as has been seen, constitutes the articulation of the hook 12, while the second forms two wings 13b, 13c which, on the other hand, prevent the body 9 of the lock from moving laterally so that it remains correctly oriented with respect to the cradle 1 and, on the other, guide it in translation.

It is quite evident that this part of the support 13 is particularly adapted to the form of the existing lock and that it could take the form of another structure depending on the lock used.

Whatever its structure, the support is fastened to a reinforcement of the floor 18 (FIGS. 1 to 4), preferably by welding.

In mounting, a bent end 19 of the return spring fits in a hole 20 in the hook while the other end 21 presses against a portion of the fixed body, in the present instance the floor reinforcement 18.

The safety-catch hook has an inner profile in the form of a cam 22 intended to cooperate with the rod of the cradle 1 when the latter is being drawn up.

Figure 3:
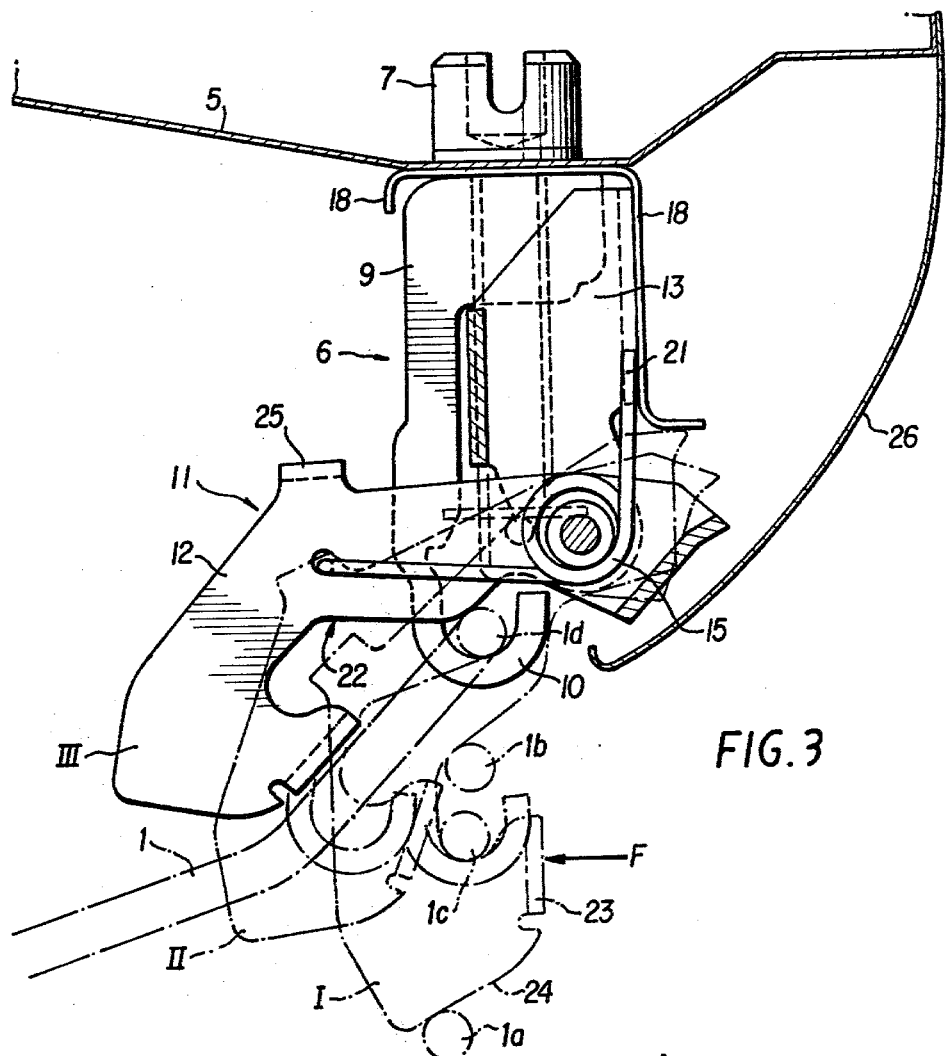
FIGS. 3 and 4 are enlarged views of the locking arrangement, identical to FIGS. 1 and 2, illustrating the operation of the safety catch.
Figure 4:
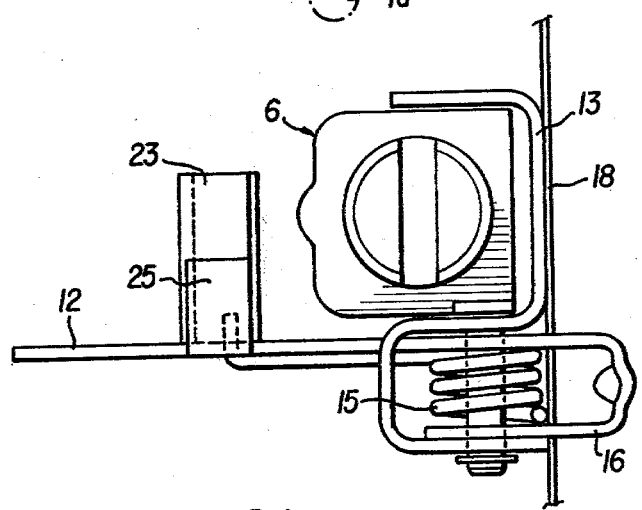

In addition, the end of the hook forms a tab 23 at right angles to the cam profile, provided for engaging the hook end 10 of the lock as is explained in the following description of operation, with reference to FIG. 3.

The cradle 1 being free and lowered with a view to, for example, changing a tire, the lock 6 and the safety catch 12 occupy the position I, called low and represented with dashed lines.

In manually raising the cradle it comes into contact at 1a on the lower profile 24 of the hook and forces it to pivot in the direction of the arrow F, carrying along with it the lock 6 by engagement of the tab 23.

The shape of the support 13 permits only a slight pivoting of the lock out of the wings 13b, 13c of the fork, the pivoting being limited by a stop 25 projecting from the outer profile of the safety catch.

The catch-lock assembly having reached intermediate position II (broken lines) the cradle automatically engages at 16 with the two aforementioned assembly elements and then returns to position I at 1c under the actions of its own weight and of the return spring 15.

Simultaneously, the rod of the cradle 1 follows the inner profile 22 of the safety catch, raising it automatically towards the position III at 1d (solid lines) while compressing the spring 15.

Thus, the hook 12 disappears under the floor 5, out of sight and protected from bumps by the rear skirt 26 of the body.

The unlocking of the cradle 1 proceeds by the reverse motions of the catch and the lock, bringing them simultaneously into position I.

The release of the cradle is effected manually by pushing on the hook 12 only, in the direction of arrow F.

In case of sudden failure of the lock 6, the hook 12 being constantly pressed against the cradle 1 by the force of spring 15 pivots to position I, the dropping of the cradle therefore automatically brings the safety catch into a position permitting restraint of the cradle.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A safety device for retaining a spare tire cradle pivotally mounted under the floor of a motor vehicle, comprising:
   a lock adapted to draw up said cradle against said vehicle; and,
   a safety catch having a hook portion pivotally mounted on a fixed part of said vehicle body by the intermediary of a support and biased by a spring means into a pivotally extended position wherein it may cooperate with a rod of said cradle to retain said rod when said lock is released, said safety catch having an inner profile in the form of a cam surface engageable with said rod during the pivoting of said safety catch to pivotally retract said safety catch under said floor when said cradle is drawn up by said lock, whereby said spring means also maintains said cam surface in engagement with said rod during the pivotal extension of said safety catch thereby ensuring engagement of the hook with the rod.

2. The safety device of claim 1, wherein the support forms a double fork having an S-shape of which the first fork supports the articulation of said hook and the second fork prevents rotation of and linearly guides said lock relative to said hook.

3. The safety device of claim 1, wherein the end of said hook has a tab at right angles engaging the end of the lock in the low position to permit a slight tipping of the assembly and the freeing of the cradle or its automatic engagement.

* * * * *